US008331288B2

(12) United States Patent
Dhanapal et al.

(10) Patent No.: US 8,331,288 B2
(45) Date of Patent: Dec. 11, 2012

(54) INTELLIGENT ACCESS POINT FOR DELIVERING LOCATION BASED INFORMATION

(75) Inventors: Karthikeyan Balaji Dhanapal, Bangalore (IN); Puneet Gupta, Bangalore (IN); Karthik G. V, Bangalore (IN)

(73) Assignee: Infosys Technologies Limited (IN)

( * ) Notice: Subject to any disclaimer, the term of this patent is extended or adjusted under 35 U.S.C. 154(b) by 572 days.

(21) Appl. No.: 12/414,923

(22) Filed: Mar. 31, 2009

(65) Prior Publication Data

US 2009/0257376 A1 Oct. 15, 2009

(30) Foreign Application Priority Data

Apr. 1, 2008 (IN) .............................. 819/CHE/2008

(51) Int. Cl.
*H04W 4/00* (2009.01)
*G06F 15/16* (2006.01)
(52) U.S. Cl. ......... 370/328; 370/338; 709/212; 709/219
(58) Field of Classification Search ........................ None
See application file for complete search history.

(56) References Cited

U.S. PATENT DOCUMENTS

| 2002/0073170 | A1* | 6/2002 | Hoffman et al. | 709/217 |
|---|---|---|---|---|
| 2003/0169713 | A1* | 9/2003 | Luo | 370/338 |
| 2004/0179512 | A1* | 9/2004 | Leblanc et al. | 370/352 |
| 2006/0209773 | A1* | 9/2006 | Hundal et al. | 370/338 |
| 2007/0014269 | A1* | 1/2007 | Sherman et al. | 370/338 |
| 2009/0059874 | A1* | 3/2009 | Carter | 370/338 |

* cited by examiner

*Primary Examiner* — Andrew Chriss
(74) *Attorney, Agent, or Firm* — Lerner, David, Littenberg, Krumholz & Mentlik, LLP

(57) ABSTRACT

A method for delivering location based information in wireless zone is disclosed. All the location based information is stored in the access point itself thus eliminating the need for backend server. Access point has the intelligence to deliver information in customized to each requesting device's display capability. To provide seamless access to local information the user will get a default web page once the device connects to access point and tries to access internet. This web page will act as a gateway to all the location based information available in the access point. Along with location based information advertisements can also be delivered to the end user in a very cost effective and targeted manner.

12 Claims, 4 Drawing Sheets

Software components of an Access Point

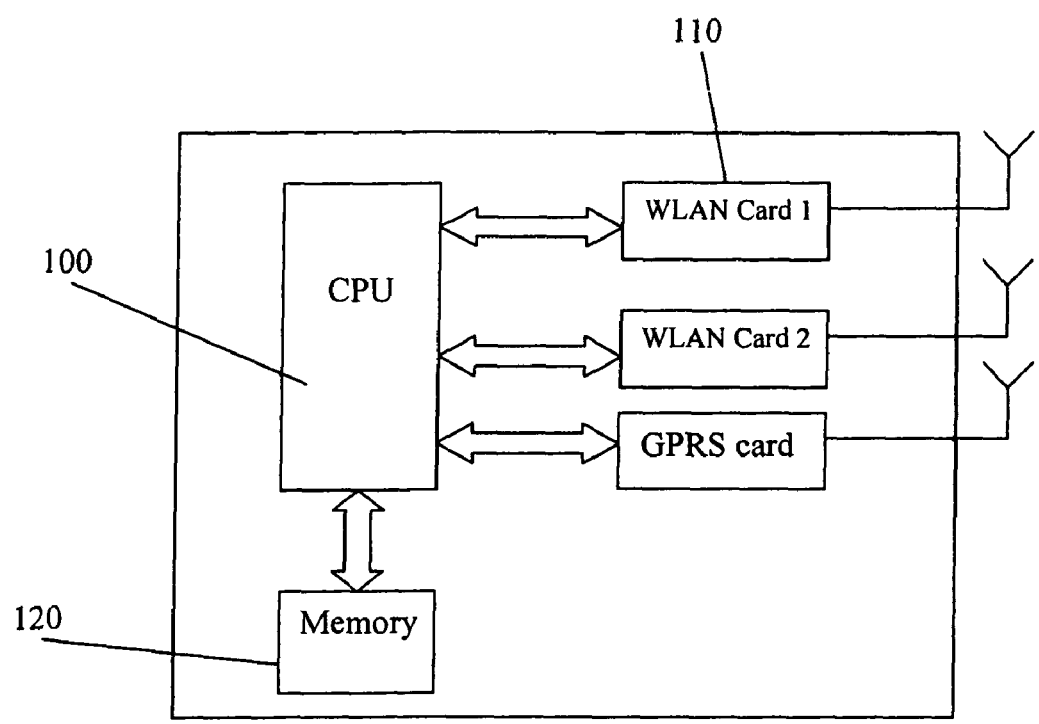
FIG. 1 Hardware components of an Access Point

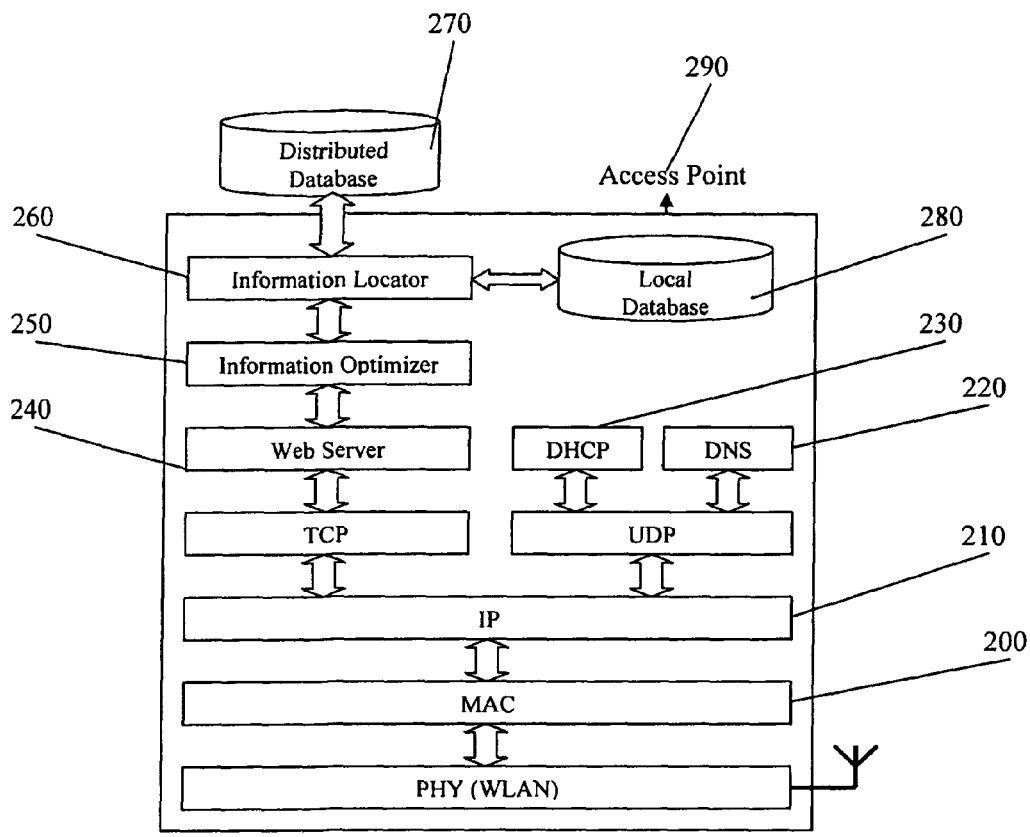
FIG 2 A: Software components of an Access Point

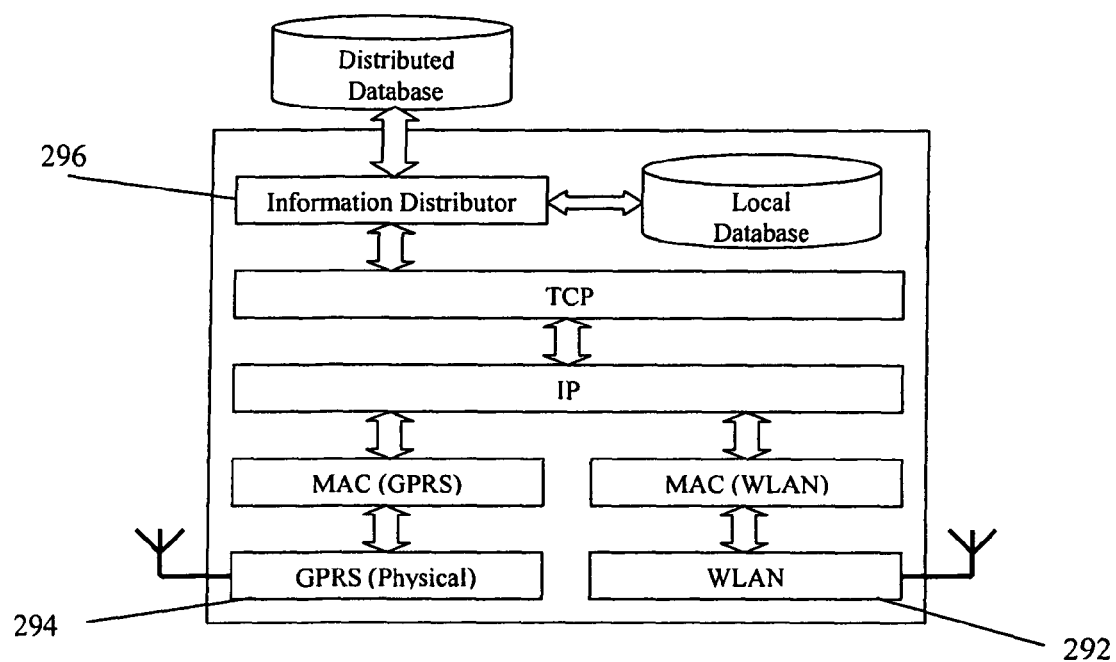
FIG 2 B: Software components of an Access Point

INTELLIGENT ACCESS POINT FOR DELIVERING LOCATION BASED INFORMATION

BACKGROUND

The invention relates generally to communications networks, and more particularly to providing location-based information to mobile terminals within wireless communication networks via an access point.

Location based information services may provide information such as local advertisements, local business information, local news, local directions and providing other information based on the location of the user.

Given the significant amount of information available over the packet-based communication networks and the ease with which such information can be delivered wirelessly to mobile users, significant efforts have been made to provide information to mobile users based on their relative locations.

In wireless communication networks, at present access points are used to communicate between mobile user and backend server. Access Points are dumb communication device that just act as transit point for data packets to and from user mobile device.

Existing access points act only as transit point for messages flowing between wireless and wired networks. Typically for delivering location based information access point will send requests from mobile devices to backend server and relays the response back to the mobile terminal. This is a very useful model when huge amounts of requests are served by the backend server (quite common when the server is serving large number of access points e.g. large wireless service providers). In case of small businesses that want to disseminate information about their product, offers, contacts etc. having a separate backend server entails additional capital and maintenance cost. Also it may be overkill for the purpose. Hence there is a need to store all the local information in the access point. This will eliminate the need for backend server and connectivity to it thus saving cost. In order to serve request for local information access point has to host a web server and the associated local information. Since it is very likely that users with diverse device capabilities will connect to the access point, information delivered to the user needs to be optimized for richer user experience. To satisfy this requirement the access point needs to host information component which will interact with web server to achieve better user experience.

If there are number of access point in particular location, and if each one of them acts independently the user might be confused about which AP to connect to. Also each access point may have different storage requirements and this requirement may vary with time. Absence of sharing of storage capacity may lead to suboptimal use. In order to solve the above two problems the access points needs for co-operation among themselves so that they present as a single network to the user and share resources like storage capacity. This way each one of them can optimally use their resources and deliver better services to the user.

For disseminating location based information one has to connect access point to backend server to store and retrieve all the location related information with respect to user mobile device/terminal. And also in this case, information delivered may not be customized to each user mobile device's capabilities.

Thus there is a need for an efficient and effective way to provide location based information to mobile users.

BRIEF DESCRIPTION

In one embodiment of the present technique, An access point (802.11) to deliver location based information customized to each device (user device) by optimizing information according to the device's display capability thus significantly enhancing user experience, the method is disclosed. Access point acts as a stand alone device which stores all the relevant local information in the local memory. This eliminates the need for a back end server and connectivity to the same which results in considerable cost savings.

In another embodiment of the present technique, a method for delivering location based information is disclosed. All the location based information is stored in the access point itself thus eliminating the need for backend server. Access point has the intelligence to deliver information in customized to each requesting device's display capability. In order to provide seamless access to local information the user will get a default web page once the device connects to access point and tries to access internet. This web page will act as a gateway to all the location based information available in the access point. Along with location based information advertisements can also be delivered to the end user in a very cost effective and targeted manner.

DRAWINGS

These and other features, aspects, and advantages of the present invention will become better understood when the following detailed description is read with reference to the accompanying drawings in which like characters represent like parts throughout the drawings, wherein:

FIG. 1 is a schematic representation of hardware components of an access point in one embodiment of the present technique;

FIG. 2A is a schematic representation of software components of an access point in one embodiment of the present technique;

FIG. 2B is a schematic representation of software components of an access point in one embodiment of the present technique.

DETAILED DESCRIPTION

Figure 3:
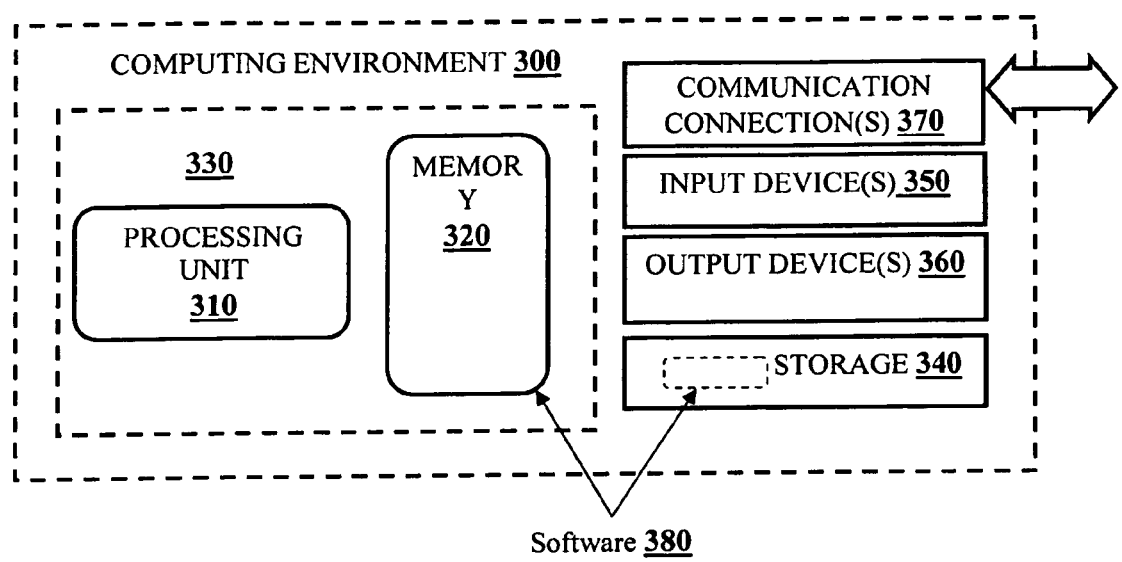
FIG. 3 is a system illustrating a generalized computer network arrangement, in one embodiment of the present technique.

The following description is full and informative description of the best method and system presently contemplated for carrying out the present invention which is known to the inventors at the time of filing the patent application. Of course, many modifications and adaptations will be apparent to those skilled in the relevant arts in view of the following description in view of the accompanying drawings and the appended claims. While the system and method described herein are provided with a certain degree of specificity, the present technique may be implemented with either greater or lesser specificity, depending on the needs of the user. Further, some of the features of the present technique may be used to advantage without the corresponding use of other features described in the following paragraphs. As such, the present description should be considered as merely illustrative of the principles of the present technique and not in limitation thereof, since the present technique is defined solely by the claims.

As a preliminary matter, the definition of the term "or" for the purpose of the following discussion and the appended claims is intended to be an inclusive "or" That is, the term "or" is not intended to differentiate between two mutually exclusive alternatives. Rather, the term "or" when employed as a conjunction between two elements is defined as including one element by itself, the other element itself, and combinations and permutations of the elements. For example, a discussion or recitation employing the terminology "A" or "B" includes: "A" by itself, "B" by itself and any combination thereof, such as "AB" and/or "BA." It is worth noting that the present discussion relates to exemplary embodiments, and the appended claims should not be limited to the embodiments discussed herein.

The present invention relates to communications networks, and more particularly to providing location-based information to mobile terminals within wireless communication networks via an access point.

An access point (802.11) to deliver location based information customized to each device (user device) by optimizing information according to the device's display capability thus significantly enhancing user experience. Access point acts as a stand alone device which stores all the relevant local information in the local memory. This eliminates the need for a back end server and connectivity to the same which results in considerable cost savings.

For disseminating location based information one has to connect access point to backend server to store and retrieve all the location related information and information delivered may not be customized to each device's capabilities.

In this invention all the location based information is stored in the access point itself thus eliminating the need for backend server. Access point has the intelligence to deliver information in customized to each requesting device's display capability.

In order to provide seamless access to local information the user will get a default web page once the device connects to access point and tries to access internet. This web page will act as a gateway to all the location based information available in the access point. Along with location based information advertisements can also be delivered to the end user in a very cost effective and targeted manner.

The access point, apart from standard components has customized DNS, web server and information optimizer. When a user tries to resolve an URL address through DNS request, access point DNS server responds by sending its IP address which will result in user getting local web page stored in access point web server. This page will act as an entry point to all the local information residing in the access point. The access point learns about the user device capabilities through page requests sent by the device and uses it to optimize and deliver information according to the device capability. Access point also provides interface to store, analyze and present user generated location based information.

Instead of a stand alone access point there could be multiple access points covering wider area. These access points can collaborate amongst themselves to share resources resulting in much efficient use of scarce resources. The access points can form an mesh network and share resources like connectivity to internet, computing power and storage. For example local information will be distributed across access points and can be accessed on demand basis. This will considerably increase the memory space available for storing local information.

Intelligent access point consists of following system components:
Hardware:
(1) CPU
(2) One or more wireless LAN interface
(3) Local storage component
Software:
(1) Web server
(2) Information optimizer
(3) Information locator
(4) Information distributor
(5) Local database
(6) DNS server
(7) DHCP server The flow of the proposed method is as follows:

Step 1: Mobile terminal connects to one of the access points.

Step 2: After successfully connecting to the access point IP address is allocated dynamically to the mobile terminal by the access point DHCP server.

Step 3: When a user clicks URL in his browser the requests are routed to the web server located in the access point. This is done by configuring DNS appropriately.

Step 4: The web server passes on the request to information optimizer which scans the request and learns about the mobile terminal capabilities. Based on this information it will optimize the web page and web server delivers it to the mobile terminal. This page will act as a gateway to all the location based information available in the access points. Due to the distributed nature of the data a specific web page requested by the user may not be available in the access point which received the request. In such cases the information locator component interacts with information locator module in other access points and retrieves the requested information.

Whenever new information is loaded into the access point an information distributor may move the data to another access point where it will stored until the information is deleted by the administrator. Information distributor relocates data based on pre-defined criteria and informs information locator about the update. The system shall have GPRS interface which will be used by administrator to upload information from remote locations.

Referring to FIG. 1 which shows the hardware components of an Access Point. It has CPU 100, one or more wireless LAN interface 110 and memory 120 for local storage Referring to FIG. 2A which shows the software components of an Access Point in one embodiment of the present technique. Any mobile terminal that comes into wireless zone senses the presence of access points 290 (AP) and allows the user of mobile terminal to choose one of them to connect with. Once the user initiates connection request, the AP 290 responds to the request which leads to successful establishment of connection at layer 2 (MAC) level 200. The mobile terminal then requests an IP 210 from DHCP server 230 running in AP 290 and the successful completion will set the stage for web page requests. Since the mobile user does not know where to look for information stored in the AP 290 network, the DNS 220 is configured in such a way that whenever user requests any web page (e.g. www.yahoo.com) default web page that is stored in the AP is sent as response to the mobile terminal. This web page acts as a gateway to all the local information stored in the AP 290. User can navigate or issue a search query to any available information.

Any request (e.g. http request) made by the user is received by the web server 240 located in the AP 290 and the message is routed to Information Optimizer (IO) 250 component. The IO 250 scans the request (http header) to learn about the mobile terminal capabilities (e.g. screen size, browser capabilities) which sent the request. The request is then passed on to the Information Locator (ILoc) 260 component which locates and retrieves the requested object from database. The requested information may lie in the local database 280 of the AP 290 which received the user request or in the distributed database 270 of an AP 290 that is part of mesh network. It is the job of the ILoc 260 to locate the object and pass it on to IO 250. The IO 250 optimizes the response according to mobile terminal capabilities (e.g. to fit into the screen size of the mobile terminal some of the less relevant content may be discarded) and then delivered through the web server 240 to the mobile terminal.

Referring to FIG. 2B which shows the software components of an Access Point in one embodiment of the present technique. Information is uploaded into the AP 290 through WLAN 292 or GPRS 294 network. GPRS 294 connectivity is very useful when loading information from remote location is required. Each access point 290 has Information Distributor (ID) 296 component through which administrator loads information into the AP 290 mesh network, The ID 296 component decides where to store the information and notifies the Information Locator 260 about the change.

A method for delivering location based information in wireless zone is disclosed. All the location based information is stored in the access point itself thus eliminating the need for backend server. Along with location based information advertisements can also be delivered to the end user in a very cost effective and targeted manner.

Exemplary Computing Environment

One or more of the above-described techniques may be implemented in or involve one or more computer systems. FIG. 3 illustrates a generalized example of a computing environment 300. The computing environment 300 is not intended to suggest any limitation as to scope of use or functionality of described embodiments.

With reference to FIG. 3, the computing environment 300 includes at least one processing unit 310 and memory 320. In FIG. 3, this most basic configuration 330 is included within a dashed line. The processing unit 310 executes computer-executable instructions and may be a real or a virtual processor. In a multi-processing system, multiple processing units execute computer-executable instructions to increase processing power. The memory 320 may be volatile memory (e.g., registers, cache, RAM), non-volatile memory (e.g., ROM, EEPROM, flash memory, etc.), or some combination of the two. In some embodiments, the memory 320 stores software 380 implementing described techniques.

A computing environment may have additional features. For example, the computing environment 300 includes storage 340, one or more input devices 350, one or more output devices 360, and one or more communication connections 370. An interconnection mechanism (not shown) such as a bus, controller, or network interconnects the components of the computing environment 300. Typically, operating system software (not shown) provides an operating environment for other software executing in the computing environment 300, and coordinates activities of the components of the computing environment 300.

The storage 340 may be removable or non-removable, and includes magnetic disks, magnetic tapes or cassettes, CD-ROMs, CD-RWs, DVDs, or any other medium which may be used to store information and which may be accessed within the computing environment 300. In some embodiments, the storage 340 stores instructions for the software 380.

The input device(s) 350 may be a touch input device such as a keyboard, mouse, pen, trackball, touch screen, or game controller, a voice input device, a scanning device, a digital camera, or another device that provides input to the computing environment 300. The output device(s) 360 may be a display, printer, speaker, or another device that provides output from the computing environment 300.

The communication connection(s) 370 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations may be described in the general context of computer-readable media. Computer-readable media are any available media that may be accessed within a computing environment. By way of example, and not limitation, within the computing environment 300, computer-readable media include memory 320, storage 340, communication media, and combinations of any of the above.

Having described and illustrated the principles of our invention with reference to described embodiments, it will be recognized that the described embodiments may be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

In view of the many possible embodiments to which the principles of our invention may be applied, we claim as our invention all such embodiments as may come within the scope and spirit of the following claims and equivalents thereto.

While the present invention has been related in terms of the foregoing embodiments, those skilled in the art will recognize that the invention is not limited to the embodiments depicted. The present invention may be practiced with modification and alteration within the spirit and scope of the appended claims. Thus, the description is to be regarded as illustrative instead of restrictive on the present invention.

The invention claimed is:

1. A method for providing location-based information to mobile terminals in wireless zones, the method comprising:
   providing a wireless access point comprising a processor, local memory and wireless network interface;
   storing in the local memory of the wireless access point:
      i) location based information;
      ii) a gateway web page having gateway web page links to the location based information stored in the local memory;
   recognizing a mobile terminal within a local wireless zone in which local wireless communications with the mobile terminal via a wireless access point are possible;
   forwarding the gateway web page to the mobile terminal; and
   forwarding from the local memory of the wireless access point to the mobile terminal, location based information corresponding to a gateway web page link selected at the mobile terminal, wherein subsequent to selection of the gateway page link, forwarding the location based information to the mobile terminal does not require access to information stored in memory external to the wireless access point.

2. The method as recited in claim 1, the wireless access point further comprising a DNS (Domain Name Service) server for redirecting to the wireless access point processor, web page requests received from the mobile terminal, wherein the processor responds to such requests by forwarding the gateway web page to the mobile terminal.

3. The method as recited in claim 1, wherein the wireless access point further comprises an information delivery component that receives page requests from the mobile terminal and modifies responses according to the mobile terminal's capability.

4. The method as recited in claim 1, wherein the wireless access point forms a mesh network with other similarly configured wireless access points for enabling a mobile terminal connected to any wireless access point to access location based information stored in the local memory of any of the other wireless access points in the network.

5. A system for providing location-based information to mobile terminals in wireless zones, the system comprising:
   a mobile terminal adapted to connect to a wireless access point;
   a wireless access point comprising:
   a processor;
   a wireless network interface;
   a local memory having stored therein:
      i) location based information;
      ii) a gateway web page having gateway web page links to the location based information stored in the local memory; and
   an information optimizer for determining mobile terminal capabilities;
   wherein the wireless terminal is configured to:
      i) recognize a mobile terminal within a local wireless zone in which local wireless communications with the mobile terminal via a wireless access point are possible;
      ii) forward the gateway web page to the mobile terminal; and
      iii) forward from the local memory of the wireless access point to the mobile terminal, location based information corresponding to a gateway web page link selection at the mobile terminal, wherein subsequent to selection of the gateway page link, forwarding the location based information to the mobile terminal does not required access to information stored in memory external to the wireless access point.

6. The system as recited in claim 5, the wireless access point further comprising an information locator for locating and retrieving information requested by the mobile terminal from the local memory of the wireless access point retrieve the requested information from the database.

7. The system as recited in claim 5, the wireless access point further comprising an information distributor component for storing in the local memory of the wireless access point, location based information received through a network.

8. The system as recited in claim 5, the wireless access point further comprising a DNS server for redirecting to the wireless access point processor, web page requests received from the mobile terminal, wherein the processor responds to such requests by forwarding the gateway web page the mobile terminal.

9. The system as recited in claim 5, further comprising at least one more wireless access point, wherein each of the wireless access points within the system are capable of sensing the others' presence and forming a mesh network to communicate with any of the other wireless access points in the network.

10. The system as recited in claim 5, wherein the mobile terminal is capable of accessing location based information in wireless networks.

11. The system as recited in claim 5, the mobile terminal comprising at least one of a mobile phone or a palm-top or lap-top or a personal digital assistant.

12. A computer program product comprising a non-transitory computer usable medium having a computer readable program code embodied therein for providing location-based information to mobile terminals in wireless zones, the computer program product comprising:
   program code adapted for storing in local memory of a wireless access point:
      i) location based information;
      ii) a gateway web page having gateway web page links to the location based information stored in the local memory;
   program code adapted for recognizing a mobile terminal within a local wireless zone in which local wireless communications with the mobile terminal via a wireless access point are possible;
   program code adapted to forward the gateway web page to the mobile terminal;
   and
   program code adapted to forward from the local memory of the wireless access point to the mobile terminal, location based information corresponding to a gateway web page link selected at the mobile terminal, wherein subsequent to selection of the gateway page link, forwarding the location based information to the mobile terminal does not require access to information stored in memory external to the wireless access point.

\* \* \* \* \*

UNITED STATES PATENT AND TRADEMARK OFFICE
CERTIFICATE OF CORRECTION

| | |
|---|---|
| PATENT NO. | : 8,331,288 B2 |
| APPLICATION NO. | : 12/414923 |
| DATED | : December 11, 2012 |
| INVENTOR(S) | : Karthikeyan Balaji Dhanapal, Puneet Gupta and G. V. Karthik |

It is certified that error appears in the above-identified patent and that said Letters Patent is hereby corrected as shown below:

Title Page, (75), after "V," insert --.--.
Title Page, (57), cancel the word "in" (third occurrence).
Title Page, (57), "internet" should read --Internet--.

In the Specification
Column 1, line 11, "Location based" should read --Location-based--.
Column 1, line 13, cancel "providing".
Column 1, line 22, after "are" insert --a--.
Column 1, line 27, "location based" should read --location-based--.
Column 1, line 33, after "In" insert --the--.
Column 1, line 47, after "are" insert --a--.
Column 1, line 53, "needs for" should read --need--.
Column 1, line 56, "their" should read --its--.
Column 1, line 58, "location based" should read --location-based--.
Column 1, line 60, "location related" should read --location-related--.
Column 1, line 65, "location based" should read --location-based--.
Column 1, line 69, "An" should read --an--.
Column 1, line 70, "location based" should read --location-based--.
Column 2, line 2, cancel "thus".
Column 2, line 3, "enhancing" should read --enhances--.
Column 2, line 9, "location based" should read --location-based--.
Column 2, line 10, "location based" should read --location-based--.
Column 2, line 12, cancel "in".
Column 2, line 16, "internet" should read --Internet--.
Column 2, line 18, "location based" should read --location-based--.
Column 2, line 44, after "is" insert --a--.
Column 2, line 64, after "or" (first occurrence) insert --.--.
Column 3, line 13, "to deliver location based" should read --delivers location-based--.
Column 3, line 17, "stand alone" should read --stand-alone--.

Signed and Sealed this
Fourteenth Day of April, 2015

Michelle K. Lee
*Director of the United States Patent and Trademark Office*

CERTIFICATE OF CORRECTION (continued)
U.S. Pat. No. 8,331,288 B2

Column 3, line 21, "location based" should read --location-based--.
Column 3, line 23, "location related" should read --location-related--.
Column 3, line 25, "location based" should read --location-based--.
Column 3, line 28, cancel "in".
Column 3, line 32, "internet" should read --Internet--.
Column 3, line 33, "location based" should read --location-based--.
Column 3, line 34, "location based" should read --location-based--.
Column 3, line 37, after "components" insert --,--.
Column 3, line 39, "an" should read --a--.
Column 3, line 48, "location based" should read --location-based--.
Column 3, line 49, "stand alone" should read --stand-alone--.
Column 3, line 53, "an" should read --a--.
Column 3, line 54, "internet" should read --Internet--.
Column 3, line 63, "interface" should read --interfaces--.
Column 4, line 19, "location based" should read --location-based--.
Column 4, line 28, after "will" insert --be--.
Column 4, line 36, "interface" should read --interfaces--.
Column 5, line 15, "location based" should read --location-based--.
Column 5, line 16, "location based" should read --location-based--.
Column 5, line 18, "location based" should read --location-based--.

In the Claims
Column 6, line 45, claim 1, "location based" should read --location-based--.
Column 6, line 47, claim 1, "location based" should read --location-based--.
Column 6, line 55, claim 1, "location based" should read --location-based--.
Column 6, line 58, claim 1, "location based" should read --location-based--.
Column 6, line 64, claim 2, cancel "," at end of line.
Column 7, line 9, claim 4, "location based" should read --location-based--.
Column 7, line 20, claim 5, "location based" should read --location-based--.
Column 7, line 22, claim 5, "location based" should read --location-based--.
Column 7, line 34, claim 5, "location based" should read --location-based--.
Column 7, line 38, claim 5, "location based" should read --location-based--.
Column 7, line 44, claim 6, "point retrieve" should read --point and retrieving--.
Column 8, line 2, claim 7, "point, location based" should read --point location-based--.
Column 8, line 5, claim 8, cancel ",".
Column 8, line 7, claim 8, "page the" should read --page to the--.
Column 8, line 10, claim 9, "point" should read --points--.
Column 8, line 11, claim 9, "system are" should read --system is--.
Column 8, line 16, claim 10, "location based" should read --location-based--.
Column 8, line 22, claim 12, "computer usable" should read --computer-usable--.
Column 8, line 22, claim 12, "computer readable" should read --computer-readable--.
Column 8, line 28, claim 12, "location based" should read --location-based--.
Column 8, line 30, claim 12, "location based" should read --location-based--.
Column 8, line 40, claim 12, "terminal, location based" should read --terminal location-based--.
Column 8, line 44, claim 12, "location based" should read --location-based--.